Patented May 5, 1931

1,804,135

UNITED STATES PATENT OFFICE

FRANK R. VALENTINE, OF BELLE CENTER, OHIO

PREPARATION CONTAINING MEDICINAL OIL

No Drawing.     Application filed December 16, 1927.  Serial No. 240,614.

My invention relates to a preparation containing medicinal oil, and has particular reference to a composition made up of oils, such as purgative oils, and other ingredients, wherein the power of the oil remains unchanged but the taste and odor of the oil is removed, and to a novel process for producing such compositions.

It is a well-known fact that castor oil has been known and used, over a long period of time, as an effective purgative; but due to the objectionable and nauseous taste and smell of the oil, it has been repugnant to most people.

The objectionable and nauseous taste and smell of castor oil is eliminated to an extent that is directly proportional to the degree of fineness to which such oil is broken up into separate molecules. Heretofore, it has been customary to break up or separate the molecules of an oil by a mechanical process which has not been satisfactory, since all of the molecules are seldom completely separated. This has generally been done by the use of carbonate of magnesia or some other similar substance that has the power of absorption.

It is the primary object of my invention to provide a composition and a process for making the same whereby the oil used therein will be broken up to the finest possible degree during the formation thereof so that the oil will readily mix with other substances to the exclusion of the objectionable and nauseous tastes and odors, at the same time, retaining its original purgative effectiveness.

Another object of my invention is to provide a composition and a process for forming the same wherein an oil, such as castor oil, may be broken up to the finest degree possible without the use of inert or mineral substances as an assisting means.

Still another object of my invention is to provide a composition and a process for making the same wherein an oil, such as castor oil, may be finely broken up and so mixed with other ingredients of the composition that the result will be a perfect candied product and the objectionable and nauseous tastes and odors will be completely eliminated.

To obtain the above results, I preferably use only one vehicle to bring about a mixture and do this in such a way that the result will be a perfect mixture, resulting directly from a solution instead of merely mechanical mixing or absorption. I have achieved the above-mentioned and other very desirable results by using the following ingredients in connection with the hereinafter described process:

The ingredients in their preferred amounts are as follows:

Isinglass or gelatin, 1½ parts by weight; oleum ricinin (pure), 120 parts by measure; saccharine or sugar, 100 parts by weight; water, 180 parts by measure.

To the water as specified above, add the isinglass and stir until the isinglass is softened. Then add a gentle heat until the isinglass is entirely dissolved. At this point the solution of isinglass and water is heated to evaporate the water until there is just sufficient remaining in the solution to fulfill the purposes hereinafter described.

The castor oil is now added and mixed thoroughly, while the solution of isinglass and water is boiling gently, and the entire mass stirred until it has the appearance of a cream color which signifies that the molecules of oil and isinglass have united to form an emulsion. The emulsion is now allowed to cool and is stirred during cooling until it assumes a very thick and creamy white color which signifies that the oil has been broken up to a very fine degree and the molecules thereof mixed thoroughly with the isinglass.

Sugar is now added and allowed to dissolve whereupon the mixture is stirred until it seems to stiffen and appears to sugar slightly. A gentle heat is applied at this point until it is certain that all of the sugar is dissolved.

A gentle heat is then applied to the mixture and this mixture is allowed to come to a boil occasionally, by intermittently increasing and decreasing the heat, for approximately 20 or 30 minutes or until such a time that the volume of the mixture is reduced to the desired degree or reaches a point where it begins to stiffen and appears as if it were about to sugar. Then, the mixture is allowed to cool and harden sufficiently to be rolled and cut to the thickness usually desired for pieces of candy.

In preparing the candies in the above described manner, tartaric acid or oil of lemon may be added just before the mixture is allowed to cool to give the mixture a more pleasing taste if such is desired. It is optional as to whether or not these ingredients are added, since it will be clearly apparent that the molecules of oil have been broken up to such an extent that the taste and odor thereof will be entirely eliminated.

By increasing the amount of isinglass or other gelatinous substance, it is possible to completely eliminate the use of sugar or other saccharine substance, although the mixture will require a longer time in which to solidify.

Each piece of the solidified mass after being cut will contain a given amount of the oil and may be covered or coated with chocolate.

By referring to the composition and the process hereinbefore set out, it will be apparent to those familiar with the art that I have provided a composition and a process for making the same wherein the molecules of the oil are so separated, and maintained in a separated state, that the objectionable and nauseous tastes and odors of the oil will be entirely eliminated. Furthermore, it will be apparent that I have produced a perfect candied product without the use of any inert or mineral substances.

The proportion of the constituents herein specified may be varied and the minor details of my process may be changed without departing from the spirit of my invention.

While I have described my composition and process as relating to castor oil, I do not wish to be limited to this one oil since other oils, such as cod-liver oil, may be used by slightly changing the proportion of the ingredients and the steps in the process of making the composition. Also, other gelatinous substances might be used in place of isinglass.

Having thus described my invention, what I claim is:

A solid stable medicinal preparation containing castor oil obtained by dissolving 1½ parts of isinglass in 180 parts of water, adding with agitation 120 parts of castor oil to said isinglass solution while gently boiling same and continuing the boiling until a white creamy emulsion is formed, cooling the emulsion while agitating same, adding 100 parts of sugar to said emulsion and heating same until the sugar has dissolved and the emulsion begins to stiffen, then intermittently heating the mass to increasing and decreasing temperatures not exceeding the boiling point until the mass begins to stiffen and appears as if it were about to sugar, and allowing the mass to cool and harden sufficiently to be formed into pieces.

In testimony whereof I hereby affix my signature.

FRANK R. VALENTINE.